J. G. STEWART.
WELDED JOINT FOR IRON AND STEEL PIPES AND TUBES.
APPLICATION FILED NOV. 22, 1912.
1,083,767.
Patented Jan. 6, 1914.
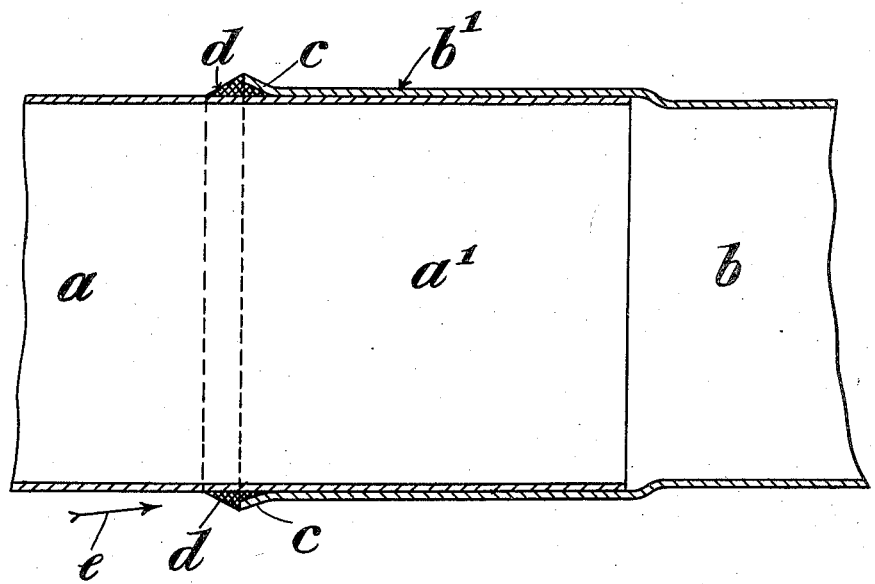
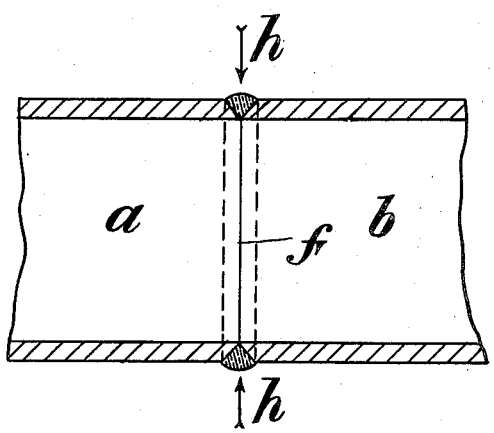
Witnesses:
O. F. Nagle.
H. G. Dieterich
Inventor:
John Graham Stewart.
By Wiedersheim & Fairbanks
Attorneys.

UNITED STATES PATENT OFFICE.

JOHN GRAHAM STEWART, OF COATBRIDGE, SCOTLAND, ASSIGNOR TO STEWARTS & LLOYDS, LIMITED, OF COATBRIDGE, SCOTLAND.

WELDED JOINT FOR IRON AND STEEL PIPES AND TUBES.

1,083,767. Specification of Letters Patent. Patented Jan. 6, 1914.

Application filed November 22, 1912. Serial No. 732,950.

*To all whom it may concern:*

Be it known that I, JOHN GRAHAM STEWART, a subject of the King of Great Britain, residing at Coatbridge, Lanarkshire, Scotland, have invented a certain new and useful Improved Welded Joint for Iron and Steel Pipes and Tubes, of which the following is a specification.

At present it is usual, when jointing iron or steel pipes and tubes by autogenous welding, to have the sections or lengths of the pipe lines slightly scarfed or beveled at the ends and to butt these scarfed ends together, the jointing metal and the pipe ends being then brought to a welding heat by means of an oxyacetylene or other flame. Such welding can be accomplished in a fairly satisfactory manner in cases where the pipes can be turned around but in cases where the pipes cannot be turned the operation is not only difficult and dangerous but the result is usually unsatisfactory. Such butt welded joints are apt to break readily under bending strains and strains arising from expansion and contraction and other causes and, in the case of gas and other mains, laid in roadways, also under the vibrations produced by the passage over them of heavy motor vehicles.

It will be understood that, with an ordinary butt joint, the heating gases, under pressure, must be applied at right angles to the pipe surface, to avoid blowing the molten metal off the pipe, so that, in so welding the pipe from below, the operator is necessarily more or less below the weld and in danger from any molten metal falling from it.

Under the present invention I have overcome the before mentioned drawbacks by forming a reinforced joint between the lengths of pipe and by effecting the weld at the end of the reinforcement and over an extended surface in such manner that the heating gases can be directed parallel to the surface of the pipe so that the operator's position need never be below the weld. In this way I obtain a strong and rigid joint which will not break readily under bending or other strains, which will be fluid tight, and which can be easily effected without the slightest danger to the operator.

Another feature of the invention is that the heating flame more or less spreads around the pipe from the part at the moment being actually welded and thereby effects a preliminary heating of the other parts thus facilitating and quickening the welding process.

On the drawings annexed, in which Figure 1 is a sectional view of my improved joint and Fig. 2 is a sectional view of an old form of joint $a$ in Fig. 1 represents one pipe length and $b$ the other pipe length. The pipe length $b$ is made with an extended faucet part or sleeve $b'$ for the reception of the end $a'$ of the pipe $a$, the parts being fitted tightly together and the part $a'$ being consequently reinforced and strengthened by the part $b'$ to such extent as to be able to withstand transverse strains. I make the end of the part $b'$ with a slight enlargement constituting an annular recess or pocket $c$ which, when the weld is being effected, is filled with the additional metal shown at $d$. The molten metal piles up in the manner shown at $d$, that is, with a triangular cross section, the longest side of the triangle being along the pipe $a$, instead of away from the pipe as in the ordinary welds, and in this manner a much more extended surface is welded than heretofore, with the result that a connection is made between the pipes $a$ and $b$ solid and strong enough to resist tensile strains arising from expansion and contraction or otherwise, and, at the same time, insuring absolute fluid tightness.

It will be seen that the operator, when making the weld $d$, can direct the heating gases along the line indicated by the arrow $e$ and parallel or nearly parallel to the pipe $a$, the operator's position being away from the weld so that he is never below the same and is, therefore, not liable to danger, while at the same time he can watch clearly the operation and make a thoroughly efficient joint. Further, the heating flame playing in the annular pocket $c$ spreads more or less around the pipe from the part for the moment being welded, and, in thus spreading around and in the groove, effects a preliminary heating of the other parts so that the welding operation is facilitated and quickened, while the pocket $c$ prevents the uniting metal from readily falling from the joint when under the welding flame.

The old manner of making welded joints is shown at Fig. 2 where the two pipe lengths *a*, *b*, are butted together and meet at *f*, the weld *g* being formed around the pipes in the position shown. Now, it will be at once seen, that with this old method of welding, the pipes *a* and *b* are always liable to break along the joint *f* under bending strains while the weld *g* is difficult to make, unless the pipes can be turned around, which, in many cases, cannot be done and further that the operator, when making the weld, must direct the flame on the line of the arrows *h* thereby exposing himself, when working at the underside of the joint to considerable danger from falling molten metal.

Having now fully described my invention, what I claim and desire to secure by Letters Patent is:—

1. A pipe joint comprising, in combination, a metal tube, a second metal tube having an extended faucet part embracing the end of said first tube and an enlarged part forming, in conjunction with the first mentioned tube, an annular pocket and a welding material filling said annular pocket and welded to the adjacent surfaces of the pocket and the first mentioned tube.

2. A pipe joint comprising, in combination, a metal tube, a second metal tube having an extended faucet part embracing the end of said first tube and an enlarged part forming, in conjunction with the first mentioned tube, an annular and angular pocket between the tubes and metal of the same nature as the said tubes filling said annular pocket and welded to the adjacent surfaces of the pocket and the first mentioned tube.

3. A pipe joint comprising, in combination, a metal tube, a second metal tube having an extended faucet part embracing the end of said first tube and an enlarged part forming, in conjunction with the first mentioned tube, an annular and angular pocket between the tubes, the mouth of said pocket being in the direction of the first mentioned tube so that the heating flame may be directed thereinto in a line substantially parallel with said first mentioned tube.

In testimony whereof I affix my signature in presence of two witnesses.

JOHN GRAHAM STEWART.

Witnesses:
WILLIAM GALL,
GEO. H. FREEMAN.